No. 636,110. Patented Oct. 31, 1899.
W. BRADY.
COTTON COMPRESS.
(Application filed Dec. 27, 1898.)

(No Model.) 2 Sheets—Sheet 1.

Witnesses
Jas. K. McCathran
Inventor
William Brady
By his Attorneys.
C. A. Snow & Co.

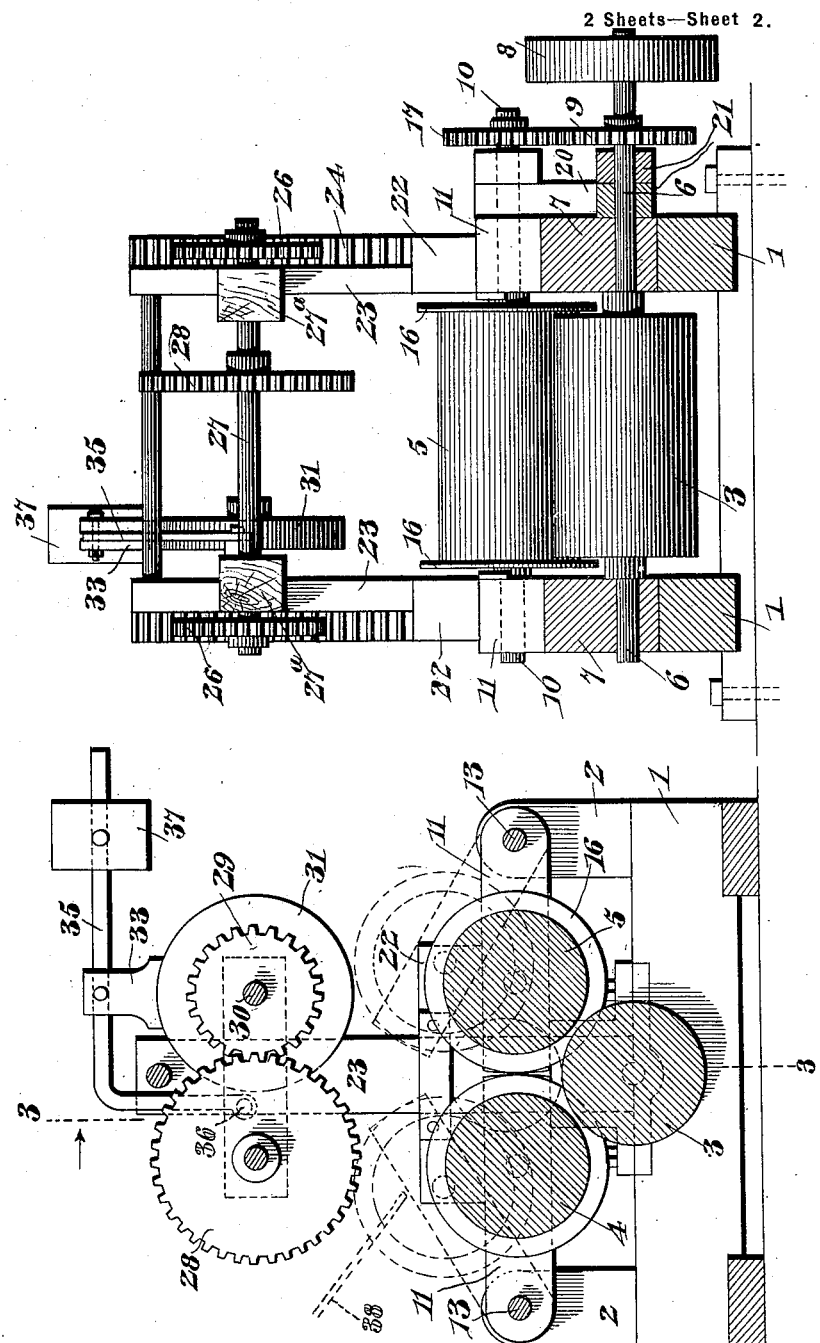

UNITED STATES PATENT OFFICE.

WILLIAM BRADY, OF HEARNE, TEXAS.

COTTON-COMPRESS.

SPECIFICATION forming part of Letters Patent No. 636,110, dated October 31, 1899.

Application filed December 27, 1898. Serial No. 700,379. (No model.)

*To all whom it may concern:*

Be it known that I, WILLIAM BRADY, a citizen of the United States, residing at Hearne, in the county of Robertson and State of Texas, have invented a new and useful Cotton-Compress, of which the following is a specification.

This invention relates to cotton-compresses; and it has for its object to provide a new and useful compress of the roller type designed for making bales of cotton of a cylindrical or roll form.

In carrying out the present invention it is the purpose to dispense with the use of the core or core-rod that is commonly employed in roller cotton-compresses and to provide simple and efficient means for making a coreless cylindrical bale of cotton.

To this end the invention contemplates the employment of three compression-rolls, which always maintain an equal distance from each other and from the center of the bale, thereby providing for evenly distributing the pressure to the bale at three distinct points, so as to produce a bale of a proper degree of density with a minimum amount of pressure.

A further object of the invention is to provide improved means for placing pressure upon the bale during the growth thereof, so as to secure the proper density thereof and make the operation of forming a coreless bale entirely practical.

In the attainment of these several objects it is of course the primary purpose of the invention to dispense with the use of a core or core-rod, as it is well understood by those skilled in the art that when a core-rod is used a bale is frequently injured when said rod is forcibly removed from the same, and, furthermore, when a cotton-bat is pressed into cylindrical form without the use of a core or core-rod the bale can be rolled out to the end of the bat without damaging the cotton.

With these and other objects in view, which will readily appear as the nature of the invention is better understood, the same consists in the novel construction, combination, and arrangement of parts hereinafter more fully described, illustrated, and claimed.

While the essential and characteristic features of the invention are necessarily susceptible to modification, still the preferred embodiment of the invention is illustrated in the accompanying drawings, in which—

Figure 1:
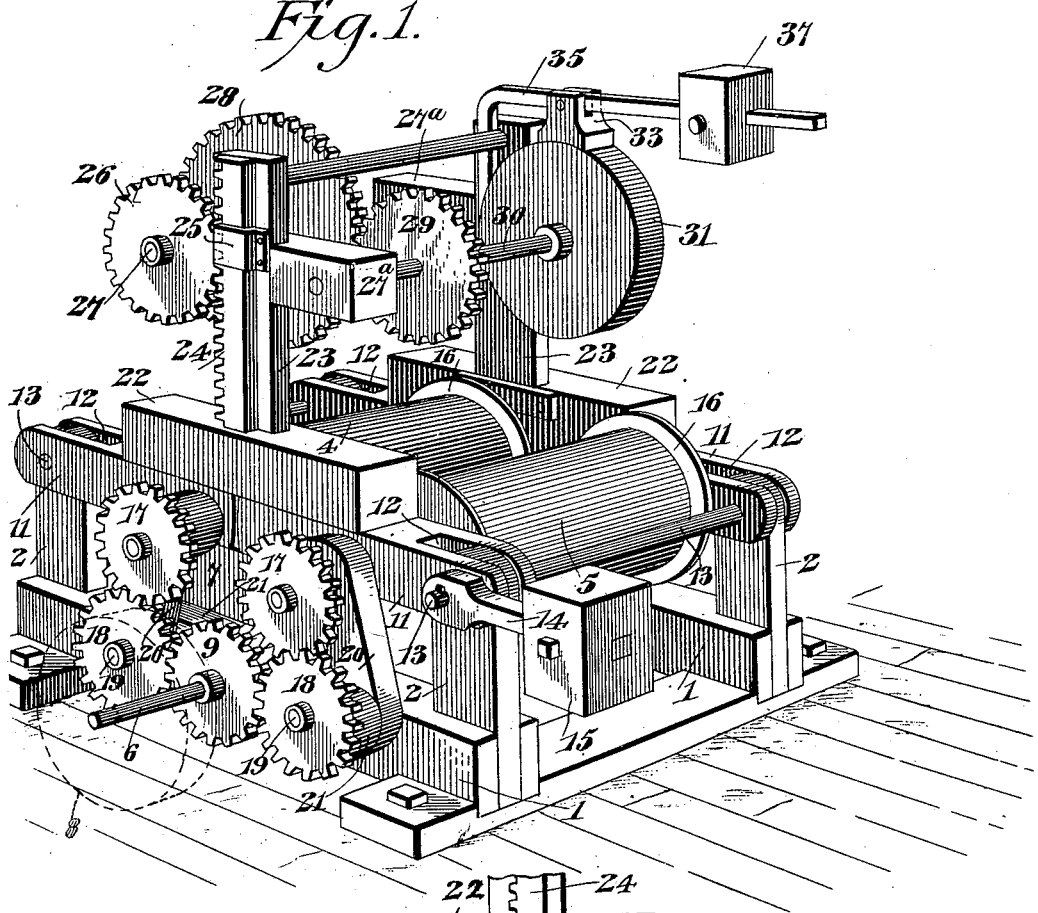
Figure 4:
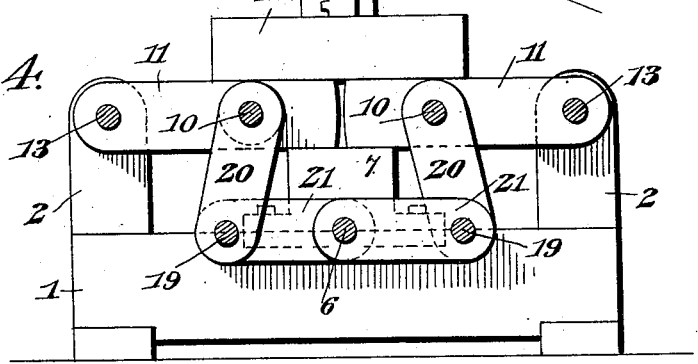

Figure 1 is a perspective view of a roller cotton-compress constructed in accordance with the present invention. Fig. 2 is a vertical longitudinal sectional view of the press. Fig. 3 is a transverse sectional view on the line 3 3 of Fig. 2. Fig. 4 is a detail side view of a portion of the press, showing the toggle-link connection with the vertically-swinging roll-frames for the movable compression-rolls.

Referring to the accompanying drawings, the numeral 1 designates the base-frame of the press, essentially comprising longitudinal and transverse beams rigidly joined together to constitute a substantial framework for supporting the entire mechanism of the press, and said base-frame 1 is designed to be anchored to a floor or other bed upon which the press is worked, and in the present invention the said base-frame 1 is provided at each end thereof with a pair of oppositely-located upright supporting-posts 2, the function of which will be presently referred to in connection with the mounting of the movable compression-rolls of the pressing mechanism.

Arranged centrally between the ends of the base-frame and transversely thereof is the horizontal rotating fixed bed-roll 3, which coöperates with a pair of movable compression-rolls 4 and 5 to provide for forming a cylindrical coreless bale of cotton, and all of said rolls 3, 4, and 5 are constructed of the same size and must necessarily rotate at the same peripheral rate of speed and in the same direction to form the cylindrical bale, and while the rolls 4 and 5 are movable in a direction toward and away from the roll 3 the latter roll maintains a fixed position within the frame to form the bed or support for the cotton, while at the same time assisting in the formation of the bale. The lower fixed rotating bed-roll 3 has projected from the opposite ends thereof the shaft extremities 6, journaled in the bearing-boxes 7, fitted to opposite sides of the base-frame 1 centrally between the ends of the latter, and one of said shaft extremities 6 of the lower bed-roll 3 has mounted thereon a band-pulley 8, which receives the belt for transmitting motion to the entire pressing mechanism, and adjacent to the band-pulley 8 the shaft extremity 6, carrying such pulley, also has mounted thereon a driving-gear 9, which provides for transmitting a positive rotation to the movable compressing-rolls in the manner hereinafter explained.

The movable compression-rolls 4 and 5 are arranged above the plane of the lower fixed bed-roll 3 and respectively upon opposite sides of the vertical center of said bed-rolls, and each of the movable compression-rolls is capable of swinging on the arc of a circle in a vertical direction, so that at all times during the formation of the bale the three compression-rolls will maintain an equal distance from each other and also from the center of the bale. To provide for the proper support of each of the movable compression-rolls, whereby the same may swing on the arc of a circle in a vertical direction, each of said rolls has the opposite shaft extremities 10 thereof journaled in bearings formed in a pair of oppositely-located frame-arms 11, constituting a swinging roll-carrying frame. The said frame-arms 11 for carrying each movable compression-roll are preferably provided with bifurcated or forked outer ends 12, loosely embracing the upper ends of the supporting-posts 2 at one end of the base-frame and rigidly secured on the opposite end portions of a transverse pivot-rod 13, the ends of which rod 13 loosely turn in bearing-openings formed in the upper ends of said supporting-posts 2. The transverse pivot-rod 13 of the frame-arms 11, carrying one of the movable compression-rolls—for instance, the roll 5—has fitted on one of its extremities an offstanding weight-arm 14, on which is slidably and adjustably mounted a weight-block 15, which provides for raising the said movable roll 5 to an abnormal position to facilitate the discharge of a completed bale from the press, as will be hereinafter explained in connection with the pressure mechanism of the machine.

Each of the movable compression-rolls is provided at its ends with peripheral guard-flanges 16, projecting beyond the peripheral surface of the roll and serving to evenly build up the ends of the bale and preventing the cotton from telescoping at such point. It will thus be seen that each movable compression-roll is a duplicate of the other and mounted in precisely the same way, and as motion is communicated to both rolls in the same manner a description of the gearing for one roll will suffice for the other. Upon one of the shaft extremities 10 of each movable compression-roll is mounted a spur-gear 17, meshing with the teeth of an idler-gear 18, mounted on a stub-journal 19, projected from the knuckle-joint of a pair of toggle-links 20 and 21. The links 20 and 21, by reason of the knuckle or pivotal connection at the point 19, constitute a toggle-link support for the idler-gear 18, the link 20 being pivotally suspended at its upper end from the shaft extremity 10, carrying the gear 17, while the other link 21 has a pivotal connection with the shaft extremity 6 of the lower fixed bed-roll 3 at one side of the driving-gear 9, carried thereby. By reason of the toggle-link connection between each roll-carrying frame and one of the shaft extremities of the lower bed-roll 3 it will be seen that the idler-gears 18 always remain at a fixed distance from the axis of the gear 17 and the driving-gear 9, with which the same also mesh, thereby providing for transmitting a positive and uniform rotation to both movable compression-rolls 4 and 5 in all positions of the latter.

The opposite pairs of roll-carrying frame-arms 11, respectively for the separate compression-rolls 4 and 5, have their inner swinging ends arranged normally in juxtaposition and disposed directly above these ends of the frame-arms, and bearing thereon are vertically-movable pressure-heads 22, slidably mounted on the guide-standards 23, rigidly fitted to opposite sides of the base-frame and arising therefrom so as to extend above the plane of movement of the movable compression-rolls. The opposite pressure-heads 22 for the side pairs of frame-arms 11 are fitted to the lower ends of vertical reciprocatory rack-bars 24, arranged to slide upon the outer sides of the standards 23, within the guide-loops 25, and meshing with the pinions 26 upon the opposite extremities of a counter-shaft 27, journaled in bearings formed in the oppositely-located cross-heads 27$^a$, secured to the standards 23 near their upper ends and projecting beyond both sides of the standards.

At an intermediate point the counter-shaft 27 has mounted thereon a spur-gear 28, which meshes with a pinion 29, secured fast on a horizontal brake-shaft 30, also journaled in bearings formed in the oppositely-located cross-heads or brackets 27$^a$. The brake-shaft 30 has secured thereon a brake wheel or disk 31, upon the flat peripheral surface of which bears a brake-shoe 33, having a bifurcation which pivotally receives the angled weight-lever 35. The angled weight-lever 35 has the lower extremity of its vertical arm pivoted at 36 to a fixed point of attachment, preferably at the inner side of the adjacent cross-head or bracket 27$^a$, while the upper horizontal arm of the said lever has slidably and adjustably mounted thereon a pressure-weight 37, which exerts a downward pressure on the brake-shoe 33, and thereby increases or diminishes the frictional engagement of the latter with the brake wheel or disk 31.

In the normal position of the various parts of the press the pressure-heads 22 bear upon the frame-arms 11, carrying the movable rolls, while the several compression-rolls are slightly out of peripheral contact, (as shown in Fig. 2 of the drawings,) which is necessary on account of the rolls having positive gearing for separately rotating the same. The bat of cotton is preferably fed into the space between the three rolls by an inclined feed-chute 38, arranged in a fixed position above the plane of the movable compression-roll 4, and as the feed of the bat continues the same will be rotated between the adjacent peripheries of the three rolls into the form of a roll, which increases in size until the complete bale of cotton is formed. As the roll of cotton between the three compression-rolls increases in size the same will tend to force the movable rolls 4 and 5 away from the lower fixed bed-roll 3, which causes the frame-arms 11 to exert a pressure against the pressure-heads 22 and move such pressure-heads in an upward direction. The movement of the pressure-heads in this direction is resisted by the brake, consisting of the brake wheel or disk 31 and the brake-shoe 33, as motion is communicated from the rack-bars 24 to the gearing which transfers motion to the brake-shaft 30. The resistance to the upward movement of the pressure-heads 22, and consequently to the upward movement of the compression-rolls 4 and 5, may be regulated by the adjustment of the pressure-weight 37 upon the weight-lever 35, and this pressure at all times will be sufficient to hold the rolls 4 and 5 firmly against the bale and give the same the required density.

When the bale has reached its full growth, the weight-lever 35 is raised manually or by any suitable means, so as to relieve the brake-wheel 31 from the pressure of the brake-shoe 33, which necessarily relieves the pressure upon the two movable compression-rolls 4 and 5, whereupon the weight 15, connected with the pivot-rod for the frame of the movable roll 5, will overbalance or further tilt the roll to a position out of contact with the bale, and then the weight of the other compression-roll 4 upon the bale will be sufficient to cause the bale to automatically fall out of the press from between the fixed bed-roll 3 and the movable roll 5.

From the foregoing it is thought that the construction, operation, and many advantages of the herein-described press will be readily apparent to those skilled in the art without further description, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a cotton-compress for forming coreless cylindrical bales, three compression-rolls arranged in a triangular group, one of said rolls being fixed and the other two above and movable in unison toward and away from the fixed roll, and also toward and away from each other, outwardly-movable supports under adjustable pressure carrying said compression-rolls, and the one compressing-roll having an automatically-operating overbalance or counterpoise.

2. In a cotton-compress for forming coreless cylindrical bales, a fixed rotating bed-roll, and a pair of movable compression-rolls arranged above the bed-roll respectively at opposite sides of the vertical center of the latter, said movable compression-rolls being under adjustable pressure and having a swinging movement on the arc of a circle, and one of the same provided with an automatically-operating overbalance or counterpoise to throw it outward when the pressure is relieved from both compression-rolls.

3. In a cotton-compress for forming coreless cylindrical bales, a fixed rotating bed-roll, a pair of movable compression-rolls arranged above the bed-roll and having a swinging movement toward and away from the fixed roll and also from each other, a pressure mechanism for resisting the upward swing of said movable rolls, a brake mechanism to regulate the pressure mechanism, and an automatically-operating overbalance or counterpoise in connection with one compression-roll to throw the latter outwardly when the pressure mechanism has been relieved from both movable rolls.

4. In a cotton-compress for forming coreless cylindrical bales, the press-frame, a lower fixed rotating bed-roll, oppositely-arranged swinging roll-carrying frames, a pair of movable compression-rolls arranged above and on opposite sides of the vertical axial center of the lower fixed bed-roll and respectively mounted in the said separate swinging frames, pressure-heads bearing upon said latter frames for resisting the upward swing of the same, a pressure mechanism for holding the swinging frames downwardly and operating through pressure-heads, and an overbalancing-weight connection with one of the said carrying-frames.

5. In a cotton-compress for forming coreless cylindrical bales, the press-frame, a lower fixed rotating bed-roll having a driving-gear upon one of its shaft extremities, oppositely-arranged swinging roll-carrying frames, a pair of movable compression-rolls disposed above the bed-roll, and respectively mounted in the separate swinging frames, pressure-heads bearing upon said latter frames, a pressure mechanism for resisting the upward swing of the compression-rolls and operating through the said pressure-heads, a spur-gear mounted on one of the shaft extremities of each movable compression-roll, a pair of toggle-links connecting each roll-carrying frame with the shaft of the bed-roll, and an idler-gear supported at the knuckle or pivotal joint of each pair of links and meshing with the adjacent spur-gear and the driving-gear.

6. In a cotton-compress for forming coreless cylindrical bales, the press-frame, a lower fixed rotating bed-roll, oppositely-arranged swinging roll-carrying frames, a pair of movable compression-rolls respectively mounted in the separate swinging frames, pressure-heads bearing upon both roll-carrying frames to resist the upward thrust thereof, and pressure mechanism for resisting the upward movement of said pressure-heads, substantially as set forth.

7. In a cotton-compress, the press-frame, the lower fixed rotating bed-roll, oppositely-arranged swinging roll-carrying frames, a pair of movable compression-rolls respectively mounted in the separate swinging frames, guide-standards arising from the press-frame at opposite sides thereof, pressure-heads slidably mounted upon said standards and bearing both roll-carrying frames, rack-bars connected with the pressure-heads and movable therewith, a brake-shaft supported by said standards and carrying a brake wheel or disk, a weight-lever pivoted at one end to a fixed point of attachment and carrying a brake-shoe normally bearing upon said brake wheel or disk, a pressure-weight adjustably mounted on said weight-lever, and intermediate gearing between said rack-bars and the brake-shaft, substantially as set forth.

In testimony that I claim the foregoing as my own I have hereto affixed my signature in the presence of two witnesses.

WILLIAM BRADY.

Witnesses:
L. BRADY,
WILLIAM RAE.